United States Patent
Jung et al.

(10) Patent No.: US 11,641,223 B2
(45) Date of Patent: May 2, 2023

(54) METHOD FOR CONTROLLING TRANSMISSION MODE OF ACCESS NODE IN ULTRA-DENSE RADIO NETWORK, AND APPARATUS THEREFOR

(71) Applicant: ELECTRONICS AND TELECOMMUNICATIONS RESEARCH INSTITUTE, Daejeon (KR)

(72) Inventors: Soo Jung Jung, Sejong-si (KR); Seung Eun Hong, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 72 days.

(21) Appl. No.: 17/462,529

(22) Filed: Aug. 31, 2021

(65) Prior Publication Data

US 2022/0131577 A1    Apr. 28, 2022

(30) Foreign Application Priority Data

Oct. 28, 2020 (KR) .................... 10-2020-0140838

(51) Int. Cl.
*H04B 7/0452* (2017.01)
*H04W 24/02* (2009.01)

(52) U.S. Cl.
CPC .......... *H04B 7/0452* (2013.01); *H04W 24/02* (2013.01)

(58) Field of Classification Search
CPC .............. H04W 24/02; H04B 7/0452
USPC ......................................... 370/328
See application file for complete search history.

(56) References Cited

U.S. PATENT DOCUMENTS

| | | | |
|---|---|---|---|
| 9,014,070 B2 | 4/2015 | Guey et al. | |
| 9,794,844 B2 | 10/2017 | Kim et al. | |
| 2015/0103934 A1 | 4/2015 | Nam et al. | |
| 2017/0208613 A1 | 7/2017 | Nam et al. | |
| 2019/0086984 A1 | 3/2019 | Yoon et al. | |
| 2021/0135733 A1* | 5/2021 | Huang | G06N 3/084 |

FOREIGN PATENT DOCUMENTS

| | | |
|---|---|---|
| EP | 2719214 B1 | 3/2015 |
| KR | 10-2034961 B1 | 10/2019 |
| WO | 2020/018008 A1 | 1/2020 |

* cited by examiner

*Primary Examiner* — Christopher R Crompton
(74) *Attorney, Agent, or Firm* — LRK Patent Law Firm

(57) ABSTRACT

An operation method of a CP may include: collecting, from terminals or ANs, information on AN(s) to which each of the terminals is connectable, and determining a set of active AN(s) based on the information; adjusting connections between active AN(s) and the terminals based on cooperative transmission constraints; calculating first energy efficiency according to the active AN(s), and calculating second energy efficiency in a state in which at least one AN of active AN(s) is deactivated or activated; and maintaining the set of active AN(s) when second energy efficiency is not improved over first energy efficiency, and updating the set of active AN(s) by excluding or further including the at least one AN when second energy efficiency is improved over first energy efficiency, and performing iteratively from the calculating first energy efficiency and second energy efficiency.

17 Claims, 6 Drawing Sheets

METHOD FOR CONTROLLING TRANSMISSION MODE OF ACCESS NODE IN ULTRA-DENSE RADIO NETWORK, AND APPARATUS THEREFOR

CROSS-REFERENCE TO RELATED APPLICATION

This application claims priority to Korean Patent Application No. 10-2020-0140838, filed on Oct. 28, 2020, with the Korean Intellectual Property Office (KIPO), the entire contents of which are hereby incorporated by reference.

BACKGROUND

1. Technical Field

The present disclosure relates to energy-efficient wireless communication systems, and more particularly, to a method for controlling a transmission node of an access node (AN) to improve energy efficiency of an ultra-dense radio access network, and an apparatus therefor.

2. Description of Related Art

In order to accommodate mobile traffic according to the explosive increase in mobile traffic, utilization of a high frequency (e.g., millimeter wave, terahertz) band capable of securing a wider bandwidth, use of more antennas to increase spectral efficiency, and deployment of highly-dense base stations (BSs) to increase a cell-splitting gain are being considered. Also, directional communications through multi-antenna beamforming techniques should be considered in order to solve a large path loss in the millimeter wave frequency band. As the density of BSs increases, a distance between BSs may decrease in a high-density base station environment (e.g., ultra-dense network (UDN)) in which the density of BSs is similar to or higher than the density of terminals (i.e., users). Accordingly, a path loss of signals is greatly reduced due to the decrease in the distance between a terminal and an adjacent BS, and a received signal strength (e.g., signal-to-noise ratio (SNR)) of the terminal may increase, but inter-cell interference also may increase.

In order to solve the performance degradation of cell-edge users due to inter-cell interferences, an inter-cell cooperation scheme (e.g., CoMP) has been used to alleviate the interferences through cooperation among BSs, but in the UDN environment, it is difficult to pre-configure a combination of BSs (i.e., CoMP set) for cooperative transmission due to unplanned installation of the BSs (or access nodes (ANs)). Therefore, adaptive configuration of BSs for cooperation according to the performance requirements, current channel conditions etc. is required.

SUMMARY

Accordingly, exemplary embodiments of the present disclosure are directed to providing a method for controlling transmission modes of access nodes (ANs) to improve spectral efficiency and reduce power consumption of the ANs in a UDN environment (or, distributed massive MIMO system), thereby improving energy efficiency. Accordingly, exemplary embodiments of the present disclosure are directed to providing an apparatus (e.g., centralized processor (CP)) controlling transmission modes of ANs to improve spectral efficiency and reduce power consumption of the ANs in a UDN environment, thereby improving energy efficiency. Accordingly, exemplary embodiments of the present disclosure are directed to providing a UDN system (or, distributed massive MIMO system) to which the above method and/or apparatus is applied.

According to a first exemplary embodiment of the present disclosure, an operation method of a centralized processor (CP), in a distributed massive MIMO system with a plurality of access nodes (ANs) and a plurality of terminals, may comprise: collecting, from the plurality of terminals (or the plurality of ANs), first information on which of the plurality of terminals is connectable, and determining a set of active AN(s) based on the first information; adjusting connections between the active AN(s) and the plurality of terminals based on cooperative transmission constraints; calculating a first energy efficiency according to the active AN(s), and calculating a second energy efficiency when at least one AN among the active AN(s) is deactivated (or activated); and maintaining the set of active AN(s) when the second energy efficiency is not improved over the first energy efficiency, and updating the set of active AN(s) by excluding or further including the at least one AN when the second energy efficiency is improved over the first energy efficiency, and performing again from the calculating the first energy efficiency and the second energy efficiency by changing the set of active ANs.

In the collecting of the first information, the AN(s) to which each of the plurality of terminals is connectable may be determined based on a channel state between each of the plurality of terminals and each of the plurality of ANs.

The channel state may be measured as a channel gain value in which signal attenuation according to a path loss and/or a shadow is reflected.

In the determining of the set of active AN(s), the active AN(s) may be determined in an order of the number of connectable terminals among the connectable AN(s).

When a plurality of ANs having a same number of connectable terminals exist among the connectable AN(s), an AN having better channel conditions with the connectable terminals may be selected as an active AN.

In the adjusting of the connections, the cooperative transmission constraints may include the number L of radio frequency (RF) chains of the active AN(s).

When a greater number of connections than L exist between the active AN(s) and the plurality of terminals, the connections with lower contribution of a first active AN are released in an order.

According to a second exemplary embodiment of the present disclosure, a centralized processor (CP) for controlling activation/deactivation of a plurality of access nodes (ANs), in a distributed massive MIMO system including the plurality of ANs and a plurality of terminals, may comprise: a processor; and a memory storing at least one instruction executed by the processor, wherein when executed by the processor, the at least one instruction causes the processor to: collect, from the plurality of terminals or the plurality of ANs, first information on which of the plurality of terminals is connectable, and determine a set of active AN(s) based on the first information; adjust connections between the active AN(s) and the plurality of terminals based on cooperative transmission constraints; calculate a first energy efficiency according to the active AN(s), and calculate a second energy efficiency when at least one AN of the active AN(s) is deactivated (or activated); and maintain the set of active AN(s) when the second energy efficiency is not improved over the first energy efficiency, and update the set of active AN(s) by excluding or further including the at least one AN when the second energy efficiency is improved over the first energy efficiency, and perform iteratively from the calculating the first energy efficiency and the second energy efficiency by changing the set of active ANs.

In the collecting of the first information, the AN(s) to which each of the plurality of terminals is connectable may be determined based on a channel state between each of the plurality of terminals and each of the plurality of ANs.

The channel state may be measured as a channel gain value in which signal attenuation according to a path loss and/or a shadow is reflected.

In the determining of the set of active AN(s), the active AN(s) may be determined in an order of the number of connectable terminals among the connectable AN(s).

When a plurality of ANs having a same number of connectable terminals exist among the connectable AN(s), an AN having better channel conditions with the connectable terminals may be selected as an active AN.

In the adjusting of the connections, the cooperative transmission constraints may include the number L of radio frequency (RF) chains of the active AN(s).

When a greater number of connections than L exist between the active AN(s) and the plurality of terminals, the connections with lower contribution of a first active AN are released in an order.

According to a third exemplary embodiment of the present disclosure, a distributed massive MIMO system may comprise: a centralized processor (CP); a plurality of access nodes (ANs) connected to the CP; and a plurality of terminals being provided with services by the plurality of ANs, wherein the CP is configured to: collect, from the plurality of terminals or the plurality of ANs, first information on which of the plurality of terminals is connectable, and determine a set of active AN(s) based on the first information; adjust connections between the active AN(s) and the plurality of terminals based on cooperative transmission constraints; calculate a first energy efficiency according to the active AN(s), and calculate a second energy efficiency when at least one AN of the active AN(s) is deactivated (or activated); and maintain the set of active AN(s) when the second energy efficiency is not improved over the first energy efficiency, or update the set of active AN(s) by excluding or further including the at least one AN when the second energy efficiency is improved over the first energy efficiency, and perform iteratively from the calculating the first energy efficiency and the second energy efficiency by changing the set of active ANs, and each of the plurality of ANs is configured to collect information on which of the plurality of terminals is connectable from the plurality of terminals; report the collected information to the CP; and transitioning to an active state or an inactive state according to control of the CP.

In the collecting of the first information, the AN(s) to which each of the plurality of terminals is connectable may be determined based on a channel state between each of the plurality of terminals and each of the plurality of ANs.

In the determining of the set of active AN(s), the active AN(s) may be determined in an order of the number of connectable terminals among the connectable AN(s).

In the adjusting of the connections, the cooperative transmission constraints may include the number L of radio frequency (RF) chains of the active AN(s).

When a greater number of connections than L exist between the active AN(s) and the plurality of terminals, the connections with lower contribution of a first active AN are released in an order.

According to the exemplary embodiments of the present disclosure, energy efficiency of the entire system may be improved through transmission mode control of ANs participating in cooperative transmission in an ultra-dense radio access network utilizing a millimeter wave band. That is, the transmission modes of the ANs may be controlled to improve spectral efficiency and reduce power consumption of the ANs to improve energy efficiency in a UDN environment. That is, ANs to be activated to perform cooperative communication may be selected. Specifically, the exemplary embodiments of the present disclosure provide methods of selecting ANs to be activated optimally in consideration of cooperative transmission constraints of ANs when using a millimeter wave band, distribution of terminals, and service requirements of the terminals.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings.

In exemplary embodiments below, a distributed massive multiple input and multiple output (MIMO) system according to an ultra-dense network (UDN) environment composed of a plurality of distributed access nodes (ANs) and a centralized processor (CP) is considered.

Figure 1:
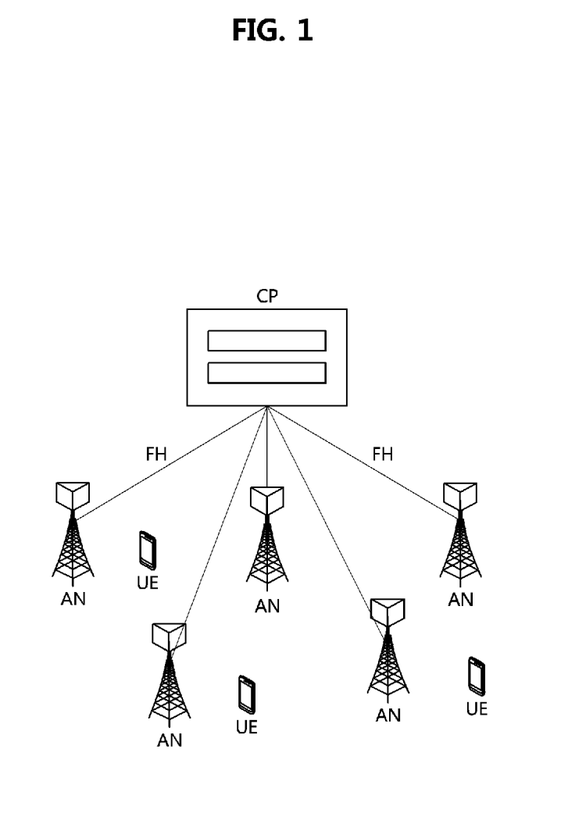
FIG. 1 is a conceptual diagram illustrating a distributed massive MIMO system to which exemplary embodiments of the present disclosure are applied.

FIG. 1 is a conceptual diagram illustrating a distributed massive MIMO system to which exemplary embodiments of the present disclosure are applied.

Referring to FIG. 1, the distributed massive MIMO system may have a form in which a network MIMO (e.g., distributed MIMO or cloud radio access network (C-RAN)) system and a massive MIMO system are combined. In the distributed massive MIMO system, distributed access nodes (ANs) may be synchronized through backhaul links, and may perform cell-free massive MIMO (CFmMIMO) transmission to provide services to all terminals (i.e., user equipments (UEs)) through the same resources.

Each of the distributed ANs may include antenna and radio frequency (RF) processing functions of a conventional BS, and may further include a part of low-level physical (PHY) layer functions of the conventional BS. In addition, the CP may be configured as a pool of base nodes (BNs) performing the remaining functions (e.g., baseband functions of high-level PHY layer, medium access control (MAC) layer and upper layer on a radio protocol stack) of the conventional in order to centrally manage radio resources. The CP may be connected to the ANs through fronthaul (FH) links.

Meanwhile, in such the distributed massive MIMO system, transmission mode control for each of the plurality of ANs in the system is required to improve energy efficiency. The transmission mode control (e.g., ON/OFF control or active/sleep mode control) may be considered to reduce power consumption. That is, when a transmission mode of an AN is activated (i.e., ON or active mode), a fixed power may be consumed to support signal transmission, reception signal processing, and basic operations of the AN. On the other hand, when it is deactivated (i.e., OFF or sleep mode), the power consumption required for the signal transmission and reception signal processing may be reduced. The transmission mode control for the ANs may be dynamically performed according to the location of service terminals and traffic loads, etc.

Energy efficiency of a radio access network system is determined by spectral efficiency and power consumption. The spectral efficiency of the distributed massive MIMO system may increase as the number of ANs participating in cooperative communication increases, but the power consumption thereof may increase accordingly. In addition, all ANs connected to the CP may be candidates for providing services to terminals, but transmissions of only some of the ANs actually may contribute to an increase in a transmission rate, thereby contributing to an increase in the spectral efficiency. Therefore, in order to improve the energy efficiency, AN selection procedures for allocating only some ANs with a high contribution to actual increase in a transmission rate for each terminal to the corresponding terminal is considered. However, when the ANs to provide services to each terminal are allocated on a terminal basis, all ANs in the system may operate in the active state. Accordingly, there is a need for an appropriate method for improving the energy efficiency in the distributed massive MIMO system, which can improve the spectral efficiency of the ANs and decrease the power consumption thereof. For this, methods for controlling the transmission modes of the ANs to provide services to the terminals through cooperative communication by some active ANs are considered. The problem of selecting optimal activated ANs that can obtain the optimal energy efficiency is generally an NP-hard problem, and schemes for fining a sub-optimal solution considering a trade-off between complexity and performance are mainly proposed. The schemes may consist of selection of ANs to be activated and optimization of the total number of activated ANs.

The selection of activated ANs and optimization of the total number of activated ANs may be performed in a manner of sequentially deactivating ANs or sequentially activating ANs.

(1) Scheme of Sequentially Deactivating ANs

A method of sequentially selecting ANs to be deactivated one by one based on a specific metric according to a given number of activated ANs may be used. For example, ANs to be deactivated may be iteratively selected starting from a state in which all ANs are activated and until the number of activated ANs becomes a given value.

Figure 2:
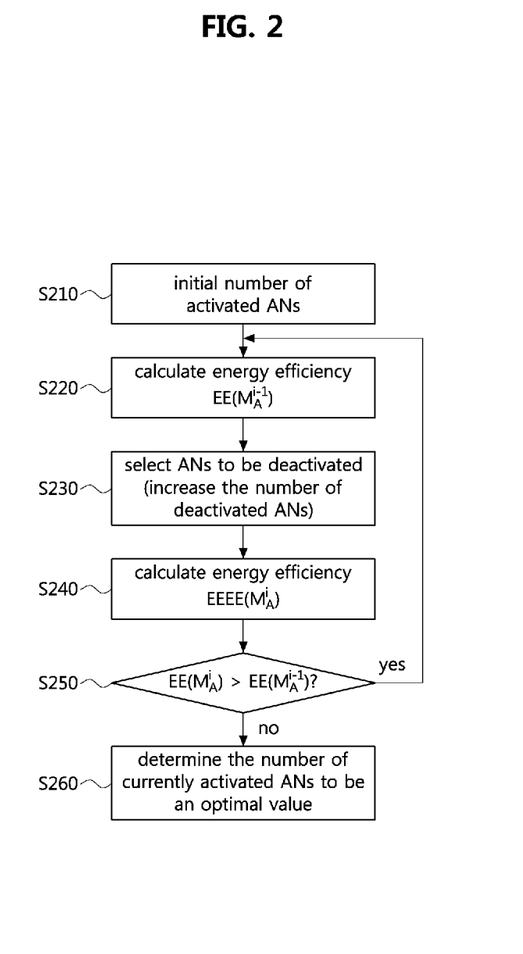
FIG. 2 is a flowchart describing a sequential AN deactivation method.

FIG. 2 is a flowchart describing a sequential AN deactivation method.

Referring to FIG. 2, given the initial number of activated ANs (S210), the CP may calculate an energy efficiency EE $(M_A^{i-1})$ according to a set of currently activated ANs (S220), determine ANs to be deactivated in a predetermined scheme (S230), and calculate an energy efficiency EE $(M_A^{i})$ when the determined ANs are deactivated (S240). The CP may compare the energy efficiency EE $(M_A^{i-1})$ according to the set of currently activated ANs with the energy efficiency EE $(M_A^{i})$ according to the set of activated ANs after deactivation of the selected ANs (S250). When the energy efficiency does not increase any more, the number of currently activated ANs may be determined to be an optimal value (S260), and when the energy efficiency is increased, the procedure may be repeated from the step S230 to additionally select ANs to be deactivated in the predetermined scheme.

In this case, a random selection scheme, a uniform distribution-based scheme, a regular distribution-based scheme, a minimum distance-based scheme, or the like may be used according to the metric for selecting ANs to be deactivated. These schemes assume a uniform distribution of terminals within a coverage. In the random selection scheme, deactivation may be determined with the same probability for each AN, and since it is performed without considering effects of deactivation of the respective ANs, it may correspond to the lowest performance of energy efficiency that can be obtained through the transmission mode control of the ANs. The uniform distribution-based scheme and the regular distribution-based scheme are schemes in which ANs satisfying a reference value (e.g., mixture discrepancy, spatial regularity) are sequentially deactivated one by one and finally activated ANs are selected to be uniformly or regularly distributed. The minimum distance-based scheme is a scheme of selecting an AN that is nearer to a third one, out of two ANs that are nearer to each other, to be deactivated so that the minimum distance between activated ANs is maximized.

(2) Scheme of Sequentially Activating ANs

Unlike the sequential AN deactivation method, a method of sequentially selecting ANs to be activated one by one based on a specific metric according to a given number of activated ANs may be used. For example, starting from a state in which all ANs are deactivated, ANs to be activated may be iteratively selected until the number of activated ANs becomes a given value.

Figure 3:
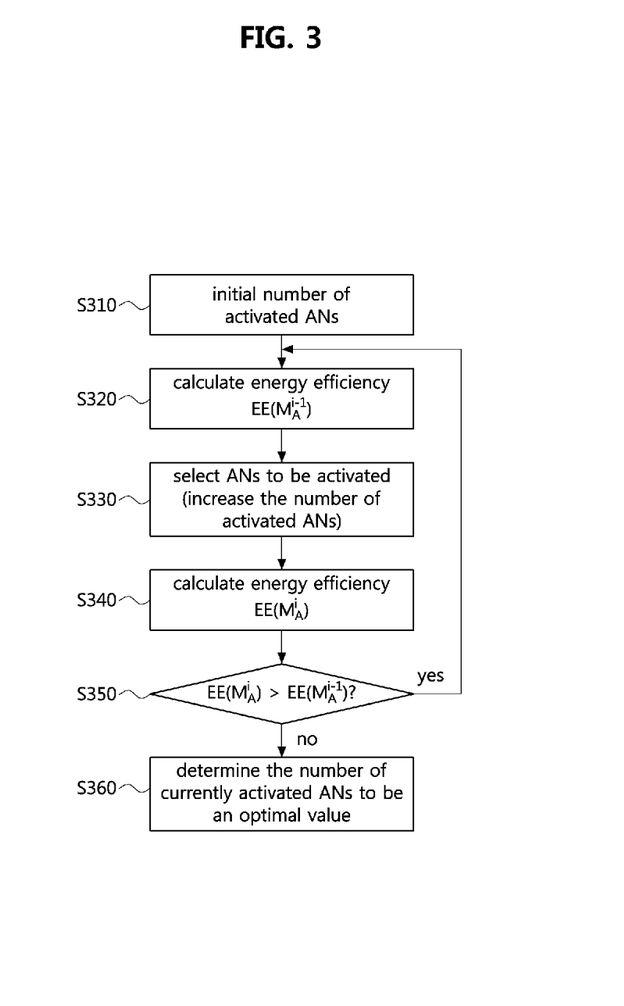
FIG. 3 is a flowchart describing a sequential AN activation method.

FIG. 3 is a flowchart describing a sequential AN activation method.

Referring to FIG. 3, given the initial number of activated ANs (S310), the CP may calculate an energy efficiency EE $(M_A^{i-1})$ according to a set of currently activated ANs (S320), determine ANs to be activated in a predetermined scheme (S330), and calculate an energy efficiency EE $(M_A^i)$ when the determined ANs are activated (S340). The CP may compare the energy efficiency EE $(M_A^{i-1})$ according to the set of currently activated ANs with the energy efficiency EE $(M_A^i)$ according to the set of activated ANs after activation of the selected ANs (S350). When the energy efficiency does not increase any more, the number of currently activated ANs may be determined to be an optimal value (S360), and when the energy efficiency is increased, the procedure may be repeated from the above step S330 to additionally select ANs to be activated in a predetermined scheme.

In this case, when selecting ANs to be activated, in order to consider short-term changes rather than long-term changes (e.g., traffic requirements according to the number of service terminals) in the system, a propagation loss between a terminal and each AN may be considered as a selection metric. That is, ANs having the smallest propagation loss for each terminal may be selected as an AN to be activated. The ANs selected by the terminal may be classified as ANs to be activated preferentially. ANs having the next smallest propagation loss for each terminal may be sequentially selected as ANs to be additionally activated among the remaining ANs. The same procedure may be repeatedly performed until a given number of activated ANs are selected.

The above-described conventional methods repeatedly perform comparison of energy efficiency according to the selection of ANs to be activated with respect to the number of possible activated ANs for optimal energy efficiency. In this case, a state in which all ANs are activated or a state in which all ANs are deactivated may be configured as an initial state under the assumption of distributions of terminals (e.g., uniform distribution of terminals). Accordingly, constraints due to directional communication of the ANs in the case of using the millimeter wave band, distribution of the terminals, and service requirements, which can be used to reduce complexity of optimization process, are not taken into consideration in configuring the initial state.

In the following exemplary embodiments, terminals may be provided with services through cooperative communication of a plurality of ANs. The CP may select ANs to be activated among the plurality of ANs so that energy efficiency is maximized. It is assumed that there are K terminals and M ANs in the network. The UDN environment in which the density of ANs is similar to or higher than the density of terminals (i.e., M≥K) is considered. Each of the distributed ANs may use a massive array antenna, but for a cost-effective implementation, a smaller number of RF chains (i.e., L RF chains) than the number of antenna elements of the array antenna may be used.

Figure 4:
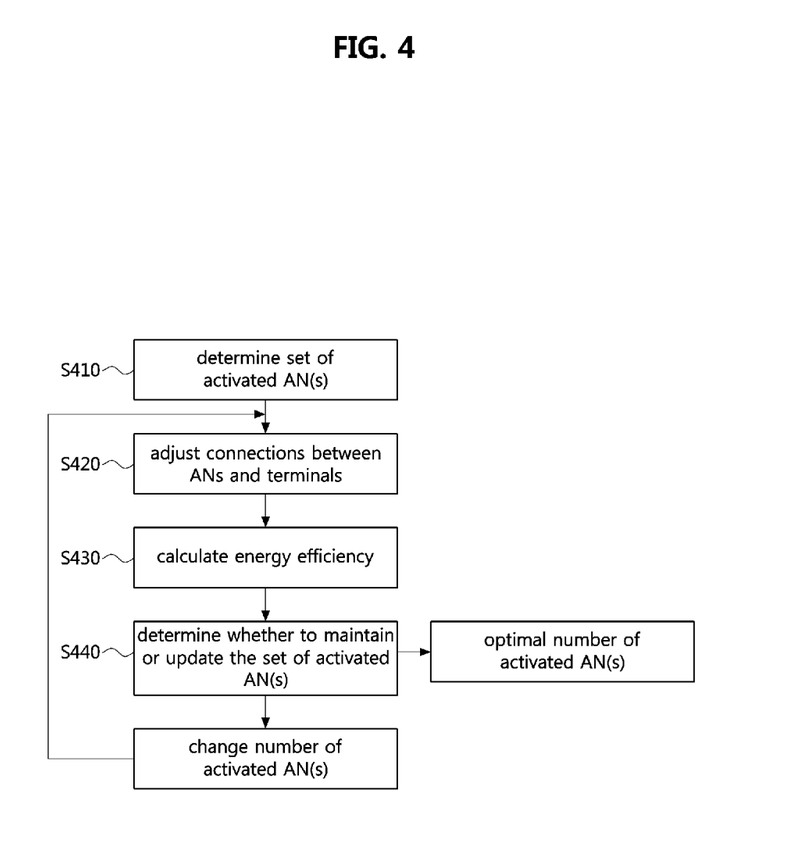
FIG. 4 is a flowchart illustrating an AN transmission mode control method according to an exemplary embodiment of the present disclosure.
Figure 5:
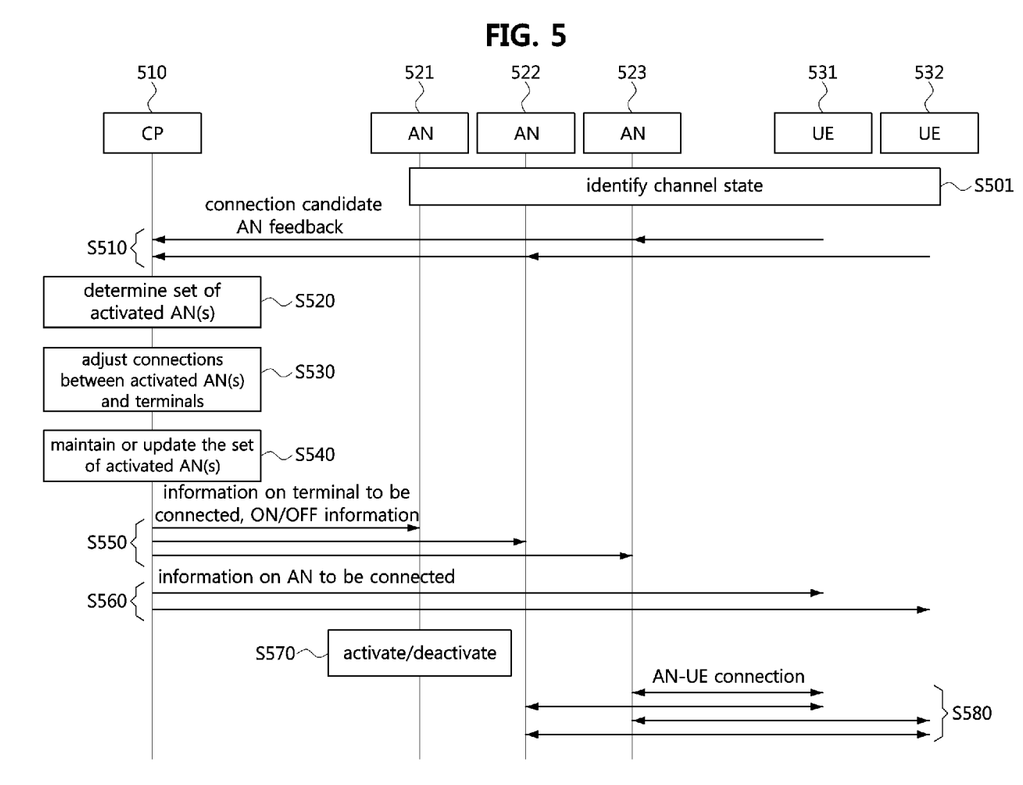
FIG. 5 is a sequence chart illustrating an AN transmission mode control method according to an exemplary embodiment of the present disclosure.

FIG. 4 is a flowchart illustrating an AN transmission mode control method according to an exemplary embodiment of the present disclosure, and FIG. 5 is a sequence chart illustrating an AN transmission mode control method according to an exemplary embodiment of the present disclosure.

Referring to FIG. 4, in an exemplary embodiment of the present disclosure, an operation method of a CP in the UDN environment may comprise a step of S410 of determining a set of activated AN(s), a step S420 of adjusting connections between the activated AN(s) and a plurality of terminals, a step S430 of calculating an energy efficiency; and a step S440 of determining whether to maintain the set of currently activated AN(s) or update the set of activated AN(s) based on a result of calculating the energy efficiency. Hereinafter, an AN transmission mode control method according to an exemplary embodiment of the present disclosure will be described in more detail with reference to FIGS. 4 and 5.

In FIG. 5, for convenience of description, an environment in which a CP 510, three ANs 521, 522, and 523, and two terminals 531 and 532 exist is exemplified. However, in an actual UDN environment, there may be much more ANs and terminals.

In the step S410 of FIG. 4, the CP 510 may collect information on ANs to which each of the terminals can connect from each of the terminals (or ANs) (S510).

In this case, a procedure S501 for identifying a channel state between each AN and each terminal may be preceded, and each terminal may measure a downlink pilot signal transmitted by each AN or each AN may measure an uplink pilot signal transmitted by each terminal to identify a channel state between each AN and each terminal.

When using downlink pilot signals, each terminal may identify a channel state with each of the plurality of ANs, select connectable ANs using a predetermined reference value, and report information on the connectable ANs to the CP 510. On the other hand, when using uplink pilot signals, each AN may identify a channel state with each terminal, determine whether it is connectable to the corresponding terminal by using a predetermined reference value, and report it to the CP 510.

In this case, as channel state information for determining whether a terminal and an AN are connectable, for example, a channel gain value or the like in consideration of a signal attenuation due to a path loss between the terminal and the AN and shadowing, may be used. That is, ANs having a signal attenuation equal to or less than a predetermined reference value may be selected as ANs connectable to each terminal. For example, whether or not the k-th terminal can connect to the m-th AN, that is determined based on channel state information $\beta_{m\,k}$ therebetween, may be expressed by Equation 1 below.

$$\{a_{mk}\} \in \{0,1\}, k=1,2,\ldots,K, m=1,2,\ldots,M \qquad [\text{Equation 1}]$$

Here, $a_{m\,k}=1$ may indicate that the k-th terminal is connectable to the m-th AN (i.e., $a_{m\,k}=1$ ƒƒ$\beta_{m\,k} \geq \beta_{TH_m}$). Meanwhile, in the step S510, each terminal may transmit information on ANs to which each terminal can connect to the CP through an AN to which each terminal is previously connected (i.e., case where each terminal identifies the channel state based on downlink pilot signals transmitted by the ANs). In this case, the collected channel state information for each AN may also be delivered to the CP.

Further, the CP may determine a set of initially activated AN(s) based on the collected information on connectable ANs (S520). That is, the CP may determine ANs to be activated based on whether the respective terminals and the respective ANs are connectable. The CP may use various methods to determine whether each terminal and each AN is connectable with each other.

In an exemplary embodiment, the CP may determine an AN having a high spectral efficiency as an AN to be activated preferentially. For example, the CP may select an AN that can be connected to the most terminals (i.e., $A_m^{max} = \max(\Sigma_k a_{m\,k})$, m=1, 2, . . . M) and determine to establish connections between the corresponding AN and the terminals. In this case, if a plurality of ANs (i.e., $\tilde{A}=\{m: \Sigma_k a_{m\,k}=A_m^{max}\}$) have the same value (i.e., the number of connectable terminals), the CP may select an AN having good channel conditions with connectable terminals among them (i.e., $\overline{m}=\arg\max_{m \in \tilde{A}}(\Sigma_{k \in K_m}\beta_{m\,k})$, $K_m=\{k:a_{m\,k}=1, m \in \tilde{A}\}$), and determine to establish connections (i.e., $\{\overline{a}_{m\,k}\}$) between the terminals and the selected AN.

The CP may repeat the same process while excluding the connection between the AN and the terminal determined to be connected (i.e., $a_{\overline{mk}}=0$). ANs whose connections with the terminals have been determined may be classified as ANs to be activated (i.e., $M_A = \{m: |K_m|>0\}$). In this case, it may be also possible to change a service requirement value of the terminal to a value excluding a service requirement satisfied by the connection with the AN(s) to be activated (i.e., $\gamma_k = \gamma_k - \text{£}(\beta_{\overline{mk}})$). That is, terminals that can satisfy the service requirements by connecting with the ANs to be activated may be excluded from the subsequent connection determination process. The above procedure may be repeated until there is no AN connectable with the terminal (i.e., $A_m^{max}=0$), and finally, ANs without connection with the terminals may be classified as ANs to be deactivated.

In the step S420 of FIG. 4, the CP may adjust connections between the activated AN(s) and the plurality of terminals based on cooperative transmission constraints (S530). In this case, the number L of RF chains of the activated AN(s) determined in the previous step S520 may be considered as the cooperative transmission constraints.

For example, when a greater number of connections than the number L of RF chains of the activate AN(s) exist with the terminals (i.e., $\Sigma_k \overline{a}_{mk} > L$, $m \in M_A$), the CP 510 may re-determine whether to connect with terminal in consideration of an influence of the corresponding AN for each terminal so that the number of connections is less than the number of RF chains (i.e., $\Sigma_k \overline{a}_{m\,k} \leq L$). As an example, for the re-determination of connections for each terminal, a contribution (i.e., $i_{m\,k}$) of the m-th AN to the k-th terminal may be considered. The contribution may be determined by a channel state related to spectral efficiency and the number of ANs to which the terminal is connected, and may be expressed as Equation 2 below.

$$i_{mk} = \frac{\beta_{mk}}{\sum_m \overline{a}_{mk}} \qquad [\text{Equation 2}]$$

Referring to Equation 2, the contribution (i.e., $i_{m\,k}$) of the m-th AN to the k-th terminal is proportional to the channel state $\beta_{m\,k}$ between the m-th AN to the k-th terminal, and it may be inversely proportional to the total number of connections (i.e., $\Sigma_m \overline{a}_{m\,k}$) that the corresponding terminal has with the ANs. That is, the contribution of each AN to the corresponding terminal may be expressed in consideration of the importance of the connection between each AN and the terminal. This is to maintain the connection with the corresponding AN for service continuity when the number of ANs to which a specific terminal is connected is one. In the case of the corresponding AN, even if the number of connections with the terminal is less than a reference value, it is not selected as an AN to be deactivated.

That is, the connections with the terminals are sequentially released for each AN in the order of the lowest contribution (i.e., $$\overline{a}_{m\tilde{k}} = 0, K_m = K_m \setminus \{\tilde{k}\}, \tilde{k} = \arg\min_{k \in K_m} \frac{\beta_{mk}}{\sum_{m \in M_A} \overline{a}_{mk}}\Bigg)$$

so that terminals less than the number of RF chains is selected, and in case of each terminal, connections with the ANs are re-adjusted so that connection with at least one AN is guaranteed. In addition, when the activated AN(s) is determined in consideration of the service requirements of the terminal in the preceding step S410, if the terminal whose connection is released according to the number of RF chains of a specific AN in the corresponding step does not satisfy the service requirements due to this, a connection with another AN may be added. The CP may update connection information to $\{\hat{a}_{m\,k}\}$ according to the re-adjusted connections between the ANs and the terminals.

Then, in the step S430 of FIG. 4, the CP may calculate a first energy efficiency according to the activated AN(s), and may calculate a second energy efficiency in a state in which at least one AN is deactivated (or activated) among the activated AN(s). In this case, as the at least one AN, activated AN(s) having connections equal to or less than a reference value (i.e., $\Sigma_k \hat{a}_{m\,k} > \hat{a}$) may be selected by using the connection information $\{\hat{a}_{m\,k}\}$ between the ANs and the terminals. However, an AN corresponding to a case where a terminal is connected only to the AN is excluded.

In the step S440, if the second energy efficiency is not improved over the first energy efficiency, the CP may maintain the set of activated AN(s), and if the second energy efficiency is improved over the first energy efficiency, the CP may update the set of the activated AN(s) by excluding (or adding) the at least one AN, and may execute again from the step S430 (S440).

That is, the CP may compare the energy efficiency (i.e., second energy efficiency) when sequentially changing the ANs that can be deactivated (or activated) to the deactivated state (or activated state) with the energy efficiency (i.e., first energy efficiency) when maintaining the currently-activated AN(s) without change. If it is determined that the energy efficiency is improved, the CP may update the set of currently active AN(s) by changing the corresponding AN to the inactive (or active) state, and release all connections between the corresponding AN and terminals connected to the corresponding AN (i.e., $\hat{a}_{m,k}=0$). That is, when calculating the energy efficiency in the i-th step, an AN m' may be determined to be deactivated additionally, another AN (i.e., $\hat{m}=\arg\max_{m\in M_A^{i-1}} i_{m,k}$) may be selected to replace connections with the terminals according to the deactivation of the AN and reconfigured, and then the energy efficiency may be calculated. The calculated energy efficiency (EE) in the i-th step may be compared with the energy efficiency in the previous step (i.e., (i−1)-th step), and if the energy efficiency is improved (i.e., $EE^{(i)} \geq EE^{(i-1)}$), the deactivation candidate AN m' of the corresponding step may be deactivated (i.e., $M_A^i = M_A^{i-1}\setminus\{m'\}$). A deactivation candidate AN of the next step may be deactivated, and the above steps may be repeatedly performed. The optimal number $M_A^{opt}$ of activated ANs may correspond to the number $M_A^i$ of activated ANs in the l-th step at which the maximum energy efficiency is obtained.

The energy efficiency of the system may be expressed as in Equation 3 below as a ratio of an spectral efficiency $S_e$ and a total power consumption $P_T$ in case of downlink.

$$EE(M_A) = \frac{B_w S_e}{P_T} \qquad \text{[Equation 3]}$$

$$S_e = \sum_{m \in M_A} S_{e,m} = \sum_{m \in M_A} \sum_{k \in K_m} S_{e,mk}$$

$$P_T = P_{fix} + \sum_{m \in M_A} (\zeta_m P_m^{tx} + B_w \xi_{FH} S_{e,m})$$

In Equation 3, $\xi_{FH}$ is a traffic-related power consumption coefficient, $\zeta_m$ is a power amplifier efficiency, and $B_w$ is a system bandwidth. $S_{e,m,k}$ is the spectral efficiency $\log_2(1+SNR_{m,k})$ that the m-th AN provides to the k-th terminal. The total power consumption $P_T$ is determined according to the number $M_A$ of activated ANs, and the spectral efficiency $S_e$ is determined by the connections between the activated ANs and the terminal, so that the energy efficiency may be changed according to the transmission mode control of the ANs.

Meanwhile, in the step S410 described above, $M_A^0 = \lceil K/L \rceil$ may be considered as an initial value for the total number $M_A$ of ANs to be activated. This is the minimum required number of activated ANs when considering the random connections of the terminals in consideration of only the maximum number L of RF chains of the activated ANs.

As such, when using the corresponding initial value, optimization of the number of ANs to be activated in consideration of energy efficiency may be performed by selecting ANs to be newly activated in each step, and through the energy efficiency comparison.

Finally, the CP 510 may transmit transmission mode control information of the optimized activated ANs and connection information between the corresponding ANs and the terminals to the respective ANs 521, 522, and 523 and the terminals 531 and 532 (S550, S560). Meanwhile, delivery of the information to the terminals 531 and 532 may be performed through ANs currently connected to the respective terminals. According to the transmission mode control information received from the CP, the ANs 521, 522, and 523 may be activated or deactivated (S570), and the activated ANs and the terminals may configure connections therebetween according to the connection information (S580).

The above procedures may be repeatedly performed according to a predetermined criterion (e.g., a specific periodicity or occurrence of a specific event) in consideration of mobility of the terminals and changes in the requirements.

Figure 6:
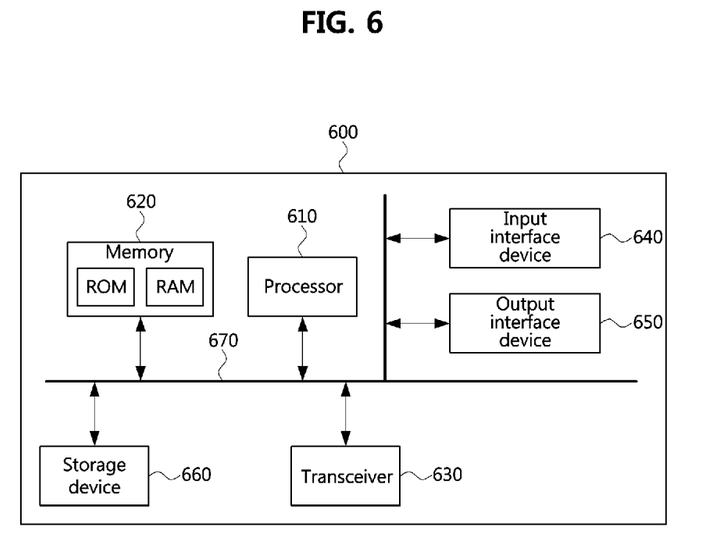
FIG. 6 is a block diagram illustrating a configuration of an apparatus for performing methods according to exemplary embodiments of the present disclosure.

FIG. 6 is a block diagram illustrating a configuration of an apparatus for performing methods according to exemplary embodiments of the present disclosure.

An apparatus shown in FIG. 6 may be a communication node (e.g., CP, AN, or terminal) for performing the methods according to the exemplary embodiments of the present disclosure.

Referring to FIG. 6, a communication node 600 may comprise at least one processor 610, a memory 620, and a transceiver 630 connected to the network for performing communications. Also, the communication node 600 may further comprise an input interface device 640, an output interface device 650, a storage device 660, and the like. Each component included in the communication node 600 may communicate with each other as connected through a bus 670. However, each component included in the communication node 600 may be connected to the processor 610 via an individual interface or a separate bus, rather than the common bus 670. For example, the processor 610 may be connected to at least one of the memory 620, the transceiver 630, the input interface device 640, the output interface device 650, and the storage device 660 via a dedicated interface.

The processor 610 may execute a program stored in at least one of the memory 620 and the storage device 660. The processor 610 may refer to a central processing unit (CPU), a graphics processing unit (GPU), or a dedicated processor on which methods in accordance with embodiments of the present disclosure are performed. Each of the memory 620 and the storage device 660 may be constituted by at least one of a volatile storage medium and a non-volatile storage medium. For example, the memory 620 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a centralized processor (CP), in a distributed massive MIMO system including a plurality of access nodes (ANs) and a plurality of terminals, the operation method comprising:
   collecting, from the plurality of terminals or the plurality of ANs, first information on which of the plurality of terminals is connectable, and determining a set of active AN(s) based on the first information;
   adjusting connections between the active AN(s) and the plurality of terminals based on cooperative transmission constraints;
   calculating a first energy efficiency according to the active AN(s), and calculating a second energy efficiency in a state in which at least one AN of the active AN(s) is deactivated or activated; and
   in response to determining that the second energy efficiency is not improved over the first energy efficiency, maintaining the set of active AN(s), and in response to determining that the second energy efficiency is improved over the first energy efficiency, updating the set of active AN(s) by excluding or further including the at least one AN, and performing iteratively from the calculating the first energy efficiency and the second energy efficiency.

2. The operation method according to claim 1, wherein in the collecting of the first information, the AN(s) to which each of the plurality of terminals is connectable is determined based on a channel state between each of the plurality of terminals and each of the plurality of ANs.

3. The operation method according to claim 1, wherein in the determining of the set of active AN(s), the active AN(s) is determined in an order of a number of connectable terminals among the AN(s).

4. The operation method according to claim 3, wherein when a plurality of ANs having a same number of connectable terminals exist, an AN having better channel conditions with the connectable terminals is selected as an active AN.

5. The operation method according to claim 1, wherein in the adjusting of the connections, the cooperative transmission constraints include the number L of radio frequency (RF) chains of the active AN(s).

6. The operation method according to claim 5, wherein when a greater number of connections than L exist between the active AN(s) and the plurality of terminals, the connections with lower contribution of a first active AN are released in an order.

7. A centralized processor (CP) for controlling activation/deactivation of a plurality of access nodes (ANs), in a distributed massive MIMO system including the plurality of ANs and a plurality of terminals, the CP comprising:
   a processor; and
   a memory storing at least one instruction executed by the processor,
   wherein when executed by the processor, the at least one instruction causes the processor to:
   collect, from the plurality of terminals or the plurality of ANs, first information on which of the plurality of terminals is connectable, and determine a set of active AN(s) based on the first information;
   adjust connections between the active AN(s) and the plurality of terminals based on cooperative transmission constraints;
   calculate a first energy efficiency according to the active AN(s), and calculate a second energy efficiency in a state in which at least one AN of the active AN(s) is deactivated or activated; and
   in response to determining that the second energy efficiency is not improved over the first energy efficiency, maintain the set of active AN(s), and in response to determining that the second energy efficiency is improved over the first energy efficiency, update the set of active AN(s) by excluding or further including the at least one AN, and perform iteratively from the calculating the first energy efficiency and the second energy efficiency.

8. The CP according to claim 7, wherein in the collecting of the first information, the AN(s) to which each of the plurality of terminals is connectable is determined based on a channel state between each of the plurality of terminals and each of the plurality of ANs.

9. The CP according to claim 8, wherein in the determining of the set of active AN(s), the active AN(s) is determined in an order of a number of connectable terminals among the connectable AN(s).

10. The CP according to claim 9, wherein when a plurality of ANs having a same number of connectable terminals exist among the connectable AN(s), an AN having better channel conditions with the connectable terminals is selected as an active AN.

11. The CP according to claim 7, wherein in the adjusting of the connections, the cooperative transmission constraints include the number L of radio frequency (RF) chains of the active AN(s).

12. The CP according to claim 11, wherein when a greater number of connections than L exist between the active AN(s) and the plurality of terminals, the connections with lower contribution of a first active AN are released in an order.

13. A distributed massive MIMO system, the distributed massive system comprising:
   a centralized processor (CP);
   a plurality of access nodes (ANs) connected to the CP; and
   a plurality of terminals being provided with services by the plurality of ANs,
   wherein the CP is configured to: collect, from the plurality of terminals or the plurality of ANs, first information on AN(s) to which each of the plurality of terminals is connectable, and determine a set of active AN(s) based on the first information; adjust connections between the active AN(s) and the plurality of terminals based on cooperative transmission constraints; calculate a first energy efficiency according to the active AN(s), and calculate a second energy efficiency in a state in which at least one AN of the active AN(s) is deactivated or activated; and in response to determining that the second energy efficiency is not improved over the first energy efficiency, maintain the set of active AN(s), and in response to determining that the second energy efficiency is improved over the first energy efficiency, update the set of active AN(s) by excluding or further including the at least one AN, and perform iteratively from the calculating the first energy efficiency and the second energy efficiency, and
   wherein each of the plurality of ANs is configured to collect information on which of the plurality of terminals is connectable from the plurality of terminals; report the collected information to the CP; and transitioning to an active state or an inactive state according to control of the CP.

14. The distributed massive MIMO system according to claim 13, wherein in the collecting of the first information, the AN(s) to which each of the plurality of terminals is connectable is determined based on a channel state between each of the plurality of terminals and each of the plurality of ANs.

15. The distributed massive MIMO system according to claim 13, wherein in the determining of the set of active AN(s), the active AN(s) is determined in an order of a number of connectable terminals among the connectable AN(s).

16. The distributed massive MIMO system according to claim 13, wherein in the adjusting of the connections, the cooperative transmission constraints include the number L of radio frequency (RF) chains of the active AN(s).

17. The distributed massive MIMO system according to claim 16, wherein when a greater number of connections than L exist between the active AN(s) and the plurality of terminals, the connections with lower contribution of a first active AN are released in an order.

* * * * *